United States Patent
Yin (10) Patent No.: US 8,588,121 B2
(45) Date of Patent: *Nov. 19, 2013

(54) METHOD FOR IMPROVING POWER EFFICIENCY OF SUBSCRIBER STATIONS

(75) Inventor: Hujun Yin, San Jose, CA (US)

(73) Assignee: Edmund P. Pfleger, Santa Clara, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 13/085,198

(22) Filed: Apr. 12, 2011

(65) Prior Publication Data

US 2011/0188432 A1 Aug. 4, 2011

Related U.S. Application Data

(63) Continuation of application No. 11/872,263, filed on Oct. 15, 2007, now Pat. No. 7,924,757.

(51) Int. Cl.
*H04B 7/00* (2006.01)

(52) U.S. Cl.
USPC ........................................ 370/311; 370/395.3

(58) Field of Classification Search
USPC .................. 370/311, 328–338, 395.3, 395.4; 455/343.1–343.6
See application file for complete search history.

(56) References Cited

U.S. PATENT DOCUMENTS

| 7,924,757 B2 | 4/2011 | Yin |
| 2005/0201269 A1 | 9/2005 | Shim et al. |
| 2005/0202822 A1 | 9/2005 | Park et al. |
| 2007/0098016 A1 | 5/2007 | Kapoor et al. |
| 2009/0097426 A1 | 4/2009 | Yin |

OTHER PUBLICATIONS

IEEE Standard 802.16e, Part 16: Air Interface for Fixed and Mobile Broadband Wireless Access Systems; Amendment 2: Physical and Medium Access Control Layers for Combined Fixed and Mobile Operation in Licensed Bands and Corrigendum 1, 2005, 864 pages.
Non-Final Office Action received for U.S. Appl. No. 11/872,263, mailed on May 13, 2010, 15 pages.
Notice of Allowance received for U.S. Appl. No. 11/872,263, mailed on Nov. 24, 2010, 4 pages.

*Primary Examiner* — Pao Sinkantarakorn
(74) *Attorney, Agent, or Firm* — Grossman, Tucker, Perreault & Pfleger, PLLC (57) ABSTRACT

Disclosed is a method for improving power efficiency of subscriber stations in a communication network. A subscriber station is uniquely identified by a base station using a connection Identifier (CID). The method includes splitting CIDs of subscriber stations to form a plurality of first parts and a plurality of second parts. The method includes generating an index including a plurality of entries and transmitting the index to a plurality of subscriber stations by the base station. One or more subscriber stations switch to a power-saving mode on absence of a match between each entry of the plurality of entries with an equivalent part of CIDs associated with the one or more subscriber stations, thereby conserving power and improving power efficiency of the subscriber station. Further, at least one information element in a sub-MAP message may be compressed to reduce overhead.

20 Claims, 7 Drawing Sheets

METHOD FOR IMPROVING POWER EFFICIENCY OF SUBSCRIBER STATIONS

CROSS REFERENCE TO RELATED APPLICATIONS

This application is a continuation of U.S. patent application Ser. No. 11/872,263, filed on Oct. 15, 2007, now U.S. Pat. No. 7,924,757, which is herein incorporated by reference in its entirety.

FIELD

The present disclosure generally relates to resource allocation to subscriber stations by a base station in a wireless communication network, and, more particularly, to a method for improving power efficiency of the subscriber stations in the wireless communication network.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting. The terms "a" and "an" herein do not denote a limitation of quantity, but rather denote the presence of at least one of the referenced item.

The present disclosure provides a method for improving power efficiency of subscriber stations in a wireless communication network. The wireless communication network includes a base station and a plurality of subscriber stations. The base station communicates resource allocation information to the plurality of subscriber stations using at least one sub-Media Access Protocol (sub-MAP) message. Each of the at least one sub-MAP message includes a plurality of information elements. Each information element of the plurality of information elements includes a Connection Identifier (CID) for uniquely identifying a subscriber station of the plurality of subscriber stations.

Each CID is split into a first part and a second part based on pre-defined criteria to form a plurality of first parts and a plurality of second parts. The base station generates an index including a plurality of entries constituted by one of the plurality of first parts and the plurality of second parts. The base station transmits the index to the plurality of subscriber stations. One or more subscriber stations of the plurality of subscriber stations switch to a power saving mode on absence of a match between each entry of the plurality of entries in the index and an equivalent part of CIDs associated with the one or more subscriber stations. The one or more subscriber stations conserve power by switching to the power saving mode, thereby improving the power efficiency of the one or more subscriber stations of the plurality of subscriber stations. Further, an overhead in sub-MAP messages may be reduced by compressing at least one information element of the plurality of information elements in the sub-MAP messages transmitted in the frames subsequent to transmission of a first sub-MAP message of the sub-MAP messages. For example, in one embodiment, overhead reduction may be achieved by reducing some fields in one information element, if this information element is repeated in the subsequent frames with some of the fields unchanged.

Figure 1:
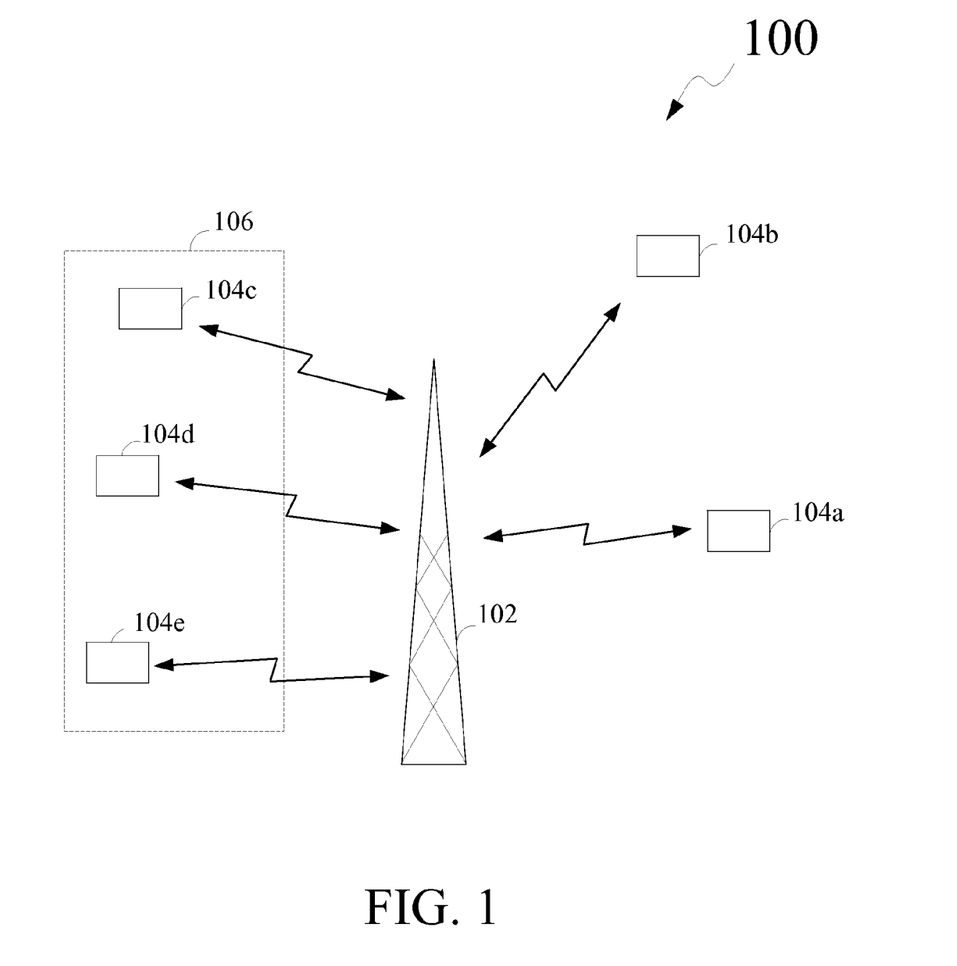
FIG. 1 represents an environment in which various embodiments of the present disclosure may be practiced.

FIG. 1 represents an environment 100 in which various embodiments of the present disclosure may be practiced. The environment 100 includes a base station 102 and a plurality of subscriber stations such as a subscriber station 104a, a subscriber station 104b, a subscriber station 104c, a subscriber station 104d and a subscriber station 104e. The subscriber stations 104a, 104b, 104c, 104d and 104e will hereinafter be collectively referred to as plurality of subscriber stations 104. The base station 102 and the plurality of subscriber stations 104 communicate over a wireless medium and as such configure a wireless communication network. Examples of a subscriber station such as a subscriber station 104a of the plurality of subscriber stations 104 include, but are not limited to, a cell phone, a wireless digital phone, a personal digital assistant (PDA) with a wireless modem, a laptop computer, and the like. It will be evident to those skilled in the art that the base station 102 and the plurality of subscriber stations 104 include means for transmitting and receiving information over a wireless medium. Further, the base station 102 may include components such as a processor, a memory and a resource allocation scheduler for performing typical functions of the base station 102.

Communication between the base station 102 and the plurality of subscriber stations 104 takes place via the wireless medium, for example, an air interface, by using wireless standards for wireless communication. An example of wireless standard for the wireless communication may include an Institute of Electrical and Electronics Engineers (IEEE) 802.16 standard also known as Worldwide Interoperability for Microwave Access (WiMax). The base station 102 and the plurality of subscriber stations 104 communicate using two independent channels: a downlink channel from the base station 102 to the plurality of subscriber stations 104 and an uplink channel from the plurality of subscriber stations 104 to the base station 102. The downlink channel will hereinafter be referred to as downlink (DL) and the uplink channel will hereinafter be referred to as uplink (UL).

The base station 102 conveys UL resource allocation information and DL resource allocation information to the plurality of subscriber stations 104 using Media Access Protocol (MAP) messages. A MAP message includes a plurality of information elements for communicating resource allocation information from the base station 102 to the plurality of subscriber stations 104. Each information element of the plurality of information elements includes a Connection Identifier (CID) which uniquely identifies a subscriber station of the plurality of subscriber stations 104. The base station 102 utilizes a CID associated with a subscriber station to communicate resource allocation information to the subscriber station.

The base station 102 uses one or more formats of MAP messages for communicating resource allocation information to the plurality of subscriber stations 104. Typical MAP message formats include a jointly-coded MAP message format, a separately-coded MAP message format, a block-coded MAP message format and the like. In a jointly-coded MAP message format, the base station 102 jointly-codes the plurality of information elements in the MAP message. The jointly-coded MAP message format supports a single MAP message that has all the resource allocation information. A subscriber station of the plurality of subscriber stations 104 has access to all the resource allocation information. In the separately-coded MAP message format used by the base station 102, the base station 102 individually codes each information element of the plurality of information elements in the MAP message. The separately-coded MAP message format supports flexibility of power as well as Modulation and Coding Scheme (MCS) adaptation.

In the block-coded MAP message format (hereinafter called 'sub-MAP message format'), the base station 102 groups a set of subscriber stations based on a common characteristic such as such as a Signal to Interference and Noise Ratio (SINR) condition and allocates resources to the set of subscriber stations in a sub-MAP message. For example, in FIG. 1, subscriber stations 104c, 104d and 104e (hereinafter collectively referred to as 'set of subscriber stations 104') from the plurality of subscriber stations 104 are grouped into a set according to a Signal to Interference and Noise Ratio (SINR) condition that is common to the set of subscriber stations 106. The base station conveys the resource allocation information to the set of subscriber stations 106 using a sub-MAP message. The sub-MAP message follows the sub-MAP message format, in that the sub-MAP message carries resource allocation information only for a set of subscriber stations such as the set of subscriber stations 106. A modulation and coding scheme (MCS) level used in the sub-MAP message is selected based on the SINR condition for the set of subscriber stations 106.

In terms of complexity involved in power adaptation, MCS adaptation, and spectral efficiency, the performance of the sub-MAP message format utilized by the base station 102 ranks between the separately-coded MAP message format and the jointly-coded MAP message format. Further, the jointly coded MAP message format has a superior coding gain and trunk efficiency as compared to the separately-coded MAP message format and the sub-MAP message format. The jointly-coded MAP message format however, has a low spectral efficiency as compared to the separately-coded MAP message format and the sub-MAP message format. The separately-coded MAP message format has a superior spectral efficiency as compared to the jointly-coded MAP message format and the sub-MAP message format.

However, the power adaptation, MCS adaptation and decoding of a MAP message supported by the separately-coded MAP message format is more complex as compared to the jointly-coded MAP message format and the sub-MAP message format. The present disclosure specifies a method for improving power efficiency of subscriber stations of the plurality of subscriber stations 104, wherein the base station 102 communicates with the plurality of subscriber stations 104 using sub-MAP messages in a sub-MAP message format. The method is explained in conjunction with FIG. 2.

Figure 2:
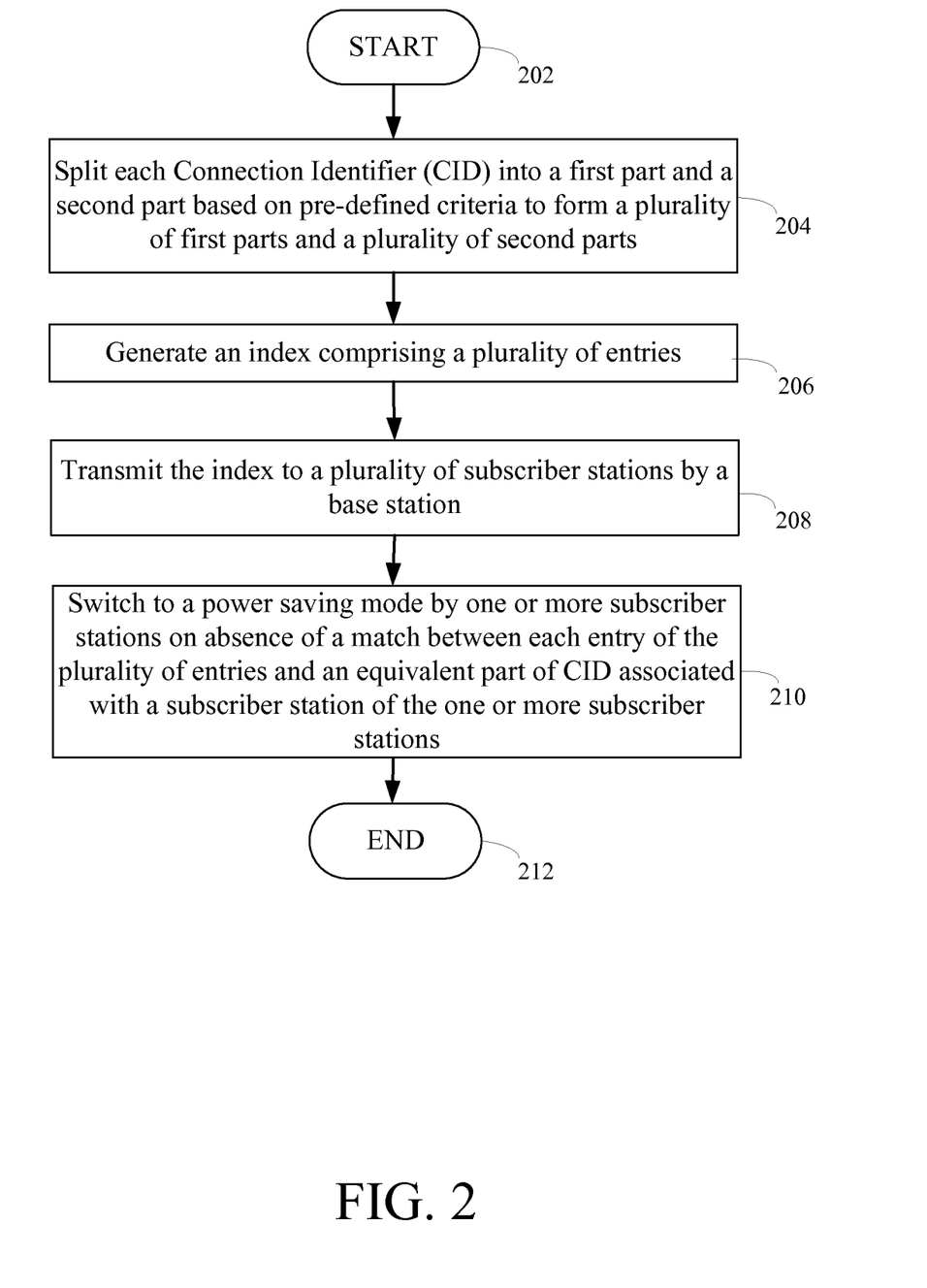
FIG. 2 is a flow diagram depicting a method for improving power efficiency of subscriber stations in a wireless communication network, in accordance with an embodiment of the present disclosure.

FIG. 2 is a flow diagram depicting a method for improving power efficiency of subscriber stations of a plurality of subscriber stations (such as the plurality of subscriber stations 104 explained in conjunction with FIG. 1) in the wireless communication network, in accordance with an embodiment of the present disclosure. The method starts at 202 with the base station (such as the base station 102) receiving requests for allocation of resources from the plurality of subscriber stations. The base station is configured to convey the resource allocation information to the plurality of subscriber stations using the sub-MAP message format, and as such uses at least one sub-MAP message for conveying the resource allocation information. At 204, the base station splits CIDs included in a plurality of information elements in a sub-MAP message of the at least one sub-MAP message to form a plurality of first parts and a plurality of second parts, based on pre-defined criteria.

At 206, the base station 102 generates an index including a plurality of entries that are constituted by one of the plurality of first parts. At 208, the base station transmits the index to the plurality of subscriber stations. At 210, one or more subscriber stations switch to a power saving mode on absence of a match between each entry of the plurality of entries in the index and an equivalent part of CIDs associated with the one or more subscriber stations. The one or more subscriber stations conserve power by switching to the power-saving mode. Accordingly, the power efficiency of the subscriber stations of the plurality of subscriber stations is improved. At 212, the method ends with the base station transmitting at least one sub-MAP message including resource allocation information to subscriber stations with CIDs of the subscriber stations matching an entry of the plurality of entries in the index. The method is explained in detail below using an exemplary embodiment of the method.

In the exemplary embodiment, the base station such as the base station 102 in the wireless communication network 100 receives requests for allocation of resources from the plurality of subscriber stations. Examples of the resources may include, channel bandwidth, time slot, Quality of Service (QoS), and the like. The base station utilizes a scheduling algorithm to allocate resources among the plurality of subscriber stations. The plurality of subscriber stations is notified of the allocation of the resources by the base station by way of the at least one sub-MAP message. Prior to transmitting the at least one sub-MAP message, the base station transmits an index to the plurality of subscriber stations. The index includes a plurality of entries which are constituted by one of a plurality of first parts. The plurality of first parts and the plurality of second parts are generated by the base station by splitting each CID into a first part and a second part.

The base station splits each CID of a subscriber station into the first part and the second part, based on pre-defined criteria.

The pre-defined criteria for splitting the CID may include at least one of a maximum number of information elements supported by the at least one sub-MAP message and the probability of the first part of CID is common to more than one subscriber. The probability of collision, as used here, is not the actual UL message collision, but the probability that the multiple subscribers having the same first part of CID. The subscribers have the same first part of CID will assume resource is allocated in the subsequent sub-MAP messages in the frame. Therefore, they will decode the subsequent sub-MAP messages. They will then combine the first part of CID in the index MAP and second part of CID in the MAP IE in the sub-MAP messages to form the complete CID. The complete CID is unique. There is no ambiguity in CID and resource allocation after the sub-MAP messages are decoded. Therefore, even multiple subscribers may have the same entry in the index MAP, only one subscriber will receive the actual allocation after the whole MAP messages in current frame are decoded.

As explained above, the base station splits each CID into the first part and the second part. The first part may include several Most Significant Bits (MSBs) of the CID or Least Significant Bits (LSBs) of the CID. Similarly, the second part of the CID may include the reminder of the Least Significant Bits (LSBs) of the CID or Most Significant Bits (MSBs) of the CID. In the exemplary embodiment of the present disclosure, the second part includes MSBs of the CID when the first part includes LSBs of the CID. In another exemplary embodiment of the present disclosure, the second part includes MSBs of the CID when the first part includes LSBs of the CID.

The base station transmits the index to the plurality of subscriber stations. Each subscriber station from the plurality of subscriber stations performs a comparison of each entry of the plurality of entries in the index with an equivalent part of a CID associated with the subscriber station for a match. If the plurality of entries in the index includes the pluralities of first parts of the CIDs, then the equivalent part of CID may be a first part of the CID of the subscriber station, and the subscriber station may compare the equivalent part of CID of the subscriber station with each entry from the plurality of entries for a match. The presence of a match between the equivalent part of CID associated with the subscriber station and an entry from the plurality of entries in the index may indicate allocation of resources by the base station to the subscriber station. The subscriber station may then wait for the at least one sub-MAP message transmitted by the base station subsequent to transmission of the index. The at least one sub-MAP message includes resource allocation information in form of UL and DL information for the subscriber station.

In case of absence of a match between the plurality of entries in the index and an equivalent part of CID associated with a subscriber station, the subscriber station may switch to a power-saving mode. The absence of the match implies that the subscriber station has not been allocated any resource by the base station. The subscriber station may switch to the power-saving mode for a specified duration of time, thereby conserving power and in turn improving power efficiency of the subscriber station. In the power-saving mode, the subscriber station does not decode the at least one sub-MAP message that are subsequently transmitted by the base station.

The at least one sub-MAP message transmitted by the base station includes a plurality of information elements with UL and DL information for subscriber stations that are allocated resources along with CIDs of the subscriber stations. The at least one sub-MAP message also includes a remaining part of CIDs of the subscriber stations. The remaining part of the CIDs may be the second parts of CIDs associated with the subscriber stations if the first parts were included in the index. Alternatively, the at least one sub-MAP message may include complete CIDs of the subscriber stations of the plurality of subscriber stations. The remaining parts of the CIDs transmitted in the at least one sub-MAP message aids in correct decoding of the resource allocation information, in an event of an entry of the plurality of entries in the index matches equivalent parts of two or more subscriber stations of the plurality of subscriber stations. The two or more subscriber stations may then receive the at least one sub-MAP message to recombine the remaining part of the CIDs with the matched equivalent parts to correctly determine an allocation of the resource by the base station. Recombining split CIDs permits correct decoding of the resource allocation information. On recombining the split CID, if the CID of a subscriber station of the two or more subscriber stations does not match the CID associated with the subscriber station, the subscriber station may then switch to the power-saving mode. For the matching of a CID, a subscriber station decodes the resource allocation information in subsequent sub-MAP messages.

Figure 3:
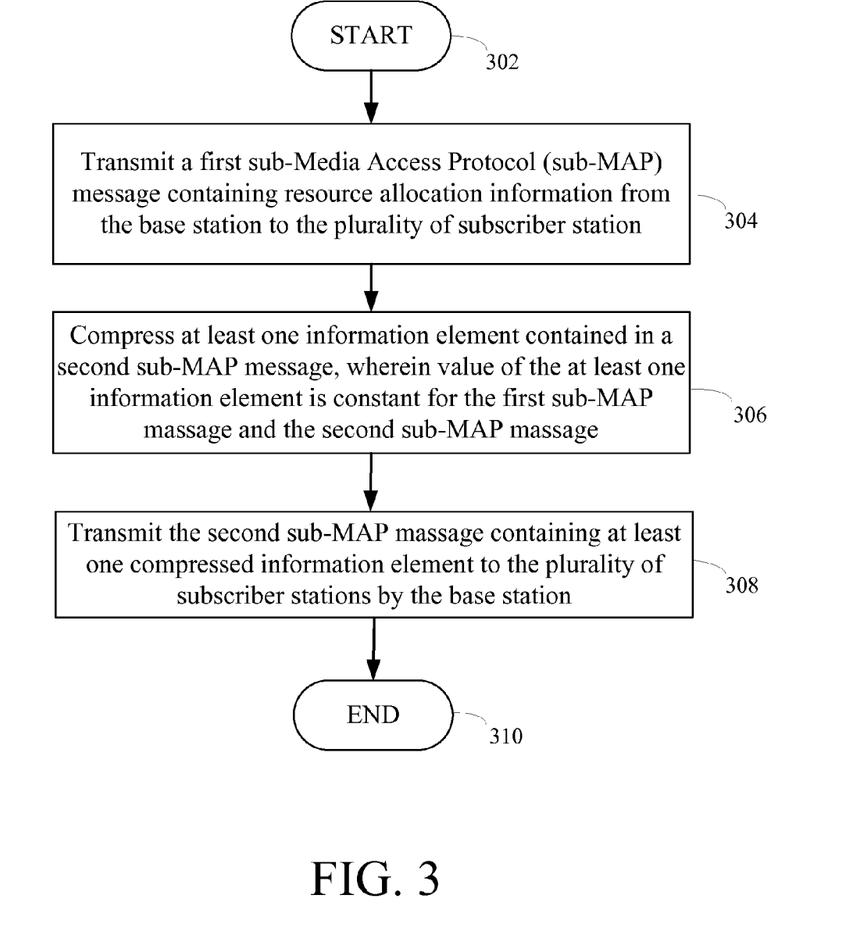
FIG. 3 is a flow diagram depicting a method for reducing overhead of sub-Media Access Protocol (sub-MAP) messages in a wireless communication network, in accordance with an embodiment of the present disclosure.

FIG. 3 is a flow diagram depicting a method for reducing overhead of sub-Media Access Protocol (sub-MAP) messages in the wireless communication network, in accordance with an embodiment of the present disclosure. The method starts at 302 with a base station, such as the base station 102, transmitting the index, such as the index explained in conjunction with FIG. 2, to a plurality of subscriber stations such as the plurality of subscriber stations 104. At 304, a first sub-MAP message of the sub-MAP messages is transmitted to the plurality of subscriber stations. The first sub-MAP message includes the resource allocation information for subscriber stations of the plurality of subscriber stations that have been allocated resources. At 306, the base station compresses at least one information element of the plurality of information elements contained in a second sub-MAP message of the sub-MAP messages. The at least one information element is constant for the first sub-MAP message and the second sub-MAP message. At 308, the base station transmits the second sub-MAP message including at least one compressed information element to the plurality of subscriber stations. Compressing the at least one information element in the second sub-MAP message reduces the overhead of the second sub-MAP message in the wireless communication network.

In one embodiment of the present disclosure, the at least one information element representing at least one of a channel information and a scheduling information included in the second sub-MAP message may be compressed by the base station 102. The at least one information element may be compressed when at least one of the channel information and the scheduling information is constant during transmission of two consecutive allocations to one subscriber.

The base station may utilize an error control mechanism called Hybrid Automatic Repeat Request (HARQ) retransmission with explicit Negative Acknowledgment (NACK) to transmit a data. If the base station does not receive an acknowledgment message for the allocation from a subscriber station of the plurality of subscriber stations within a specified duration (i.e. a missing acknowledgment timeout), a retransmission of the sub-MAP message is triggered by the base station. The retransmitted sub-MAP message may include the resource allocation information for a change in allocation of resources for the plurality of subscriber stations. However, if the resource allocation information remains unchanged from the previously transmitted sub-MAP message, the retransmitted sub-MAP message may compress the resource allocation information.

Further, if a non-adaptive and asynchronous HARQ is being utilized by the base station then transmission mode information may be excluded from the retransmitted sub-MAP message. A transmission mode information in the information elements may be compressed as transmission mode remains unchanged for consecutive retransmissions of MPDU in a non-adaptive and asynchronous HARQ. An HARQ channel ID (ACID) and Incremental Redundancy (IR) may be included in the retransmitted sub-MAP message. Further, if the retransmission of the MPDU is not triggered by the NACK but by the missing acknowledgment timeout. If MPDU is not successfully decoded, a NACK is sent, however, if MAP messages is not correctly decoded, no NACK will be sent, retransmission is triggered by HARQ missing acknowledged timeout, in this case, the complete allocation information may be re-sent. Then, all information elements of the plurality of information elements are included in the sub-MAP message that is retransmitted by the base station without compressing any information. In one embodiment of the present disclosure, the sub-MAP message including compressed information elements are retransmitted to the subscriber stations from the plurality of subscriber stations when the sub-MAP message is undelivered.

The base station may utilize an error control scheme called HARQ transmission after explicit Acknowledgment (ACK). When the base station receives an acknowledgment from a subscriber station, the transmission mode information and the resource allocation information may remain unchanged. The subscriber station may then use the transmission mode information and the resource allocation information from a previous transmission of a sub-MAP message. The base station may compress the transmission mode information and the resource allocation information in information elements of following sub-MAP messages. However, a first transmission of a sub-MAP message from the base station may include the plurality of information elements without any compressed information. It will be apparent to a person ordinarily skilled in the art that compression can be extended to other types of information based on redundancy of information in consecutive transmissions.

The compression of the at least one information element may also depend on probability of change in resource allocation as well as a probability of change in transmission mode change. For an average number of bits for resource allocation denoted by Nr, an average number of bits for transmission mode denoted by Nm, the probability of resource allocation change denoted by Pr, the probability of transmission mode change denoted by Pm and a probability of an HARQ retransmission denoted by Ph, an average number bits denoted by N required for resource allocation and transmission mode in an ideal compression may be derived using following formula:

$$N = Nr(1-Pr) + Nm(1-Pm).$$

For a value of Pr and Pm less than 0.5, bits representing the resource allocation information and bits representing the transmission mode information may be reduced by more than 50% using above formula for the ideal compression. Moreover, if the base station transmits sub-MAP messages in a predictable pattern, then a static (persistent) allocation may be utilized by the base station to further reduce sub-MAP message overhead.

Figure 4A:
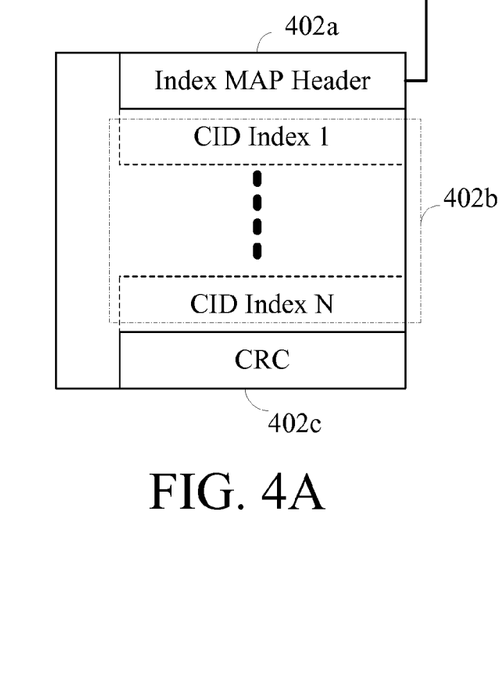
FIGS. 4A, 4B and 4C illustrate formats of an index, a first sub-MAP message of at least one sub-MAP message and a subsequent sub-MAP message of the at least one sub-MAP message, in accordance with an exemplary embodiment of the present disclosure.
Figure 4B:
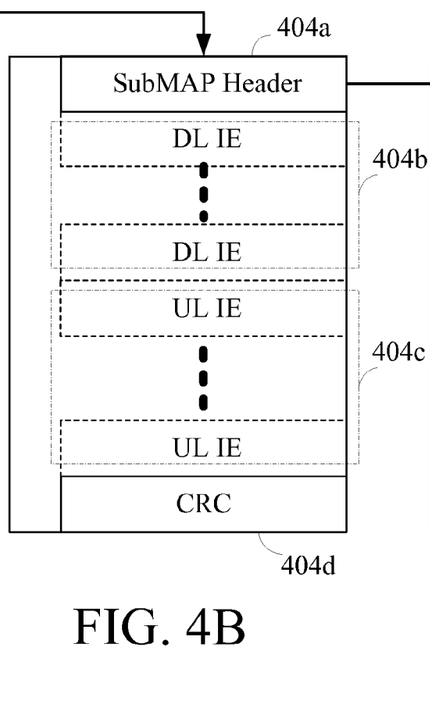
Figure 4C:
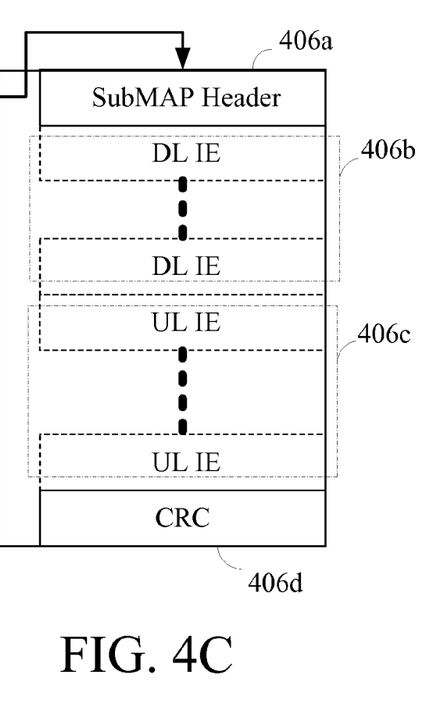

FIGS. 4A, 4B and 4C illustrate formats of an index 402, a first sub-MAP message 404 of the at least one sub-MAP message and a subsequent sub-MAP message 406 of the at least one sub-MAP message respectively, in accordance with an exemplary embodiment of the present disclosure. The first sub-MAP message 404, such as the first sub-MAP message explained in conjunction with FIG. 3 is transmitted by the base station subsequent to the transmission of the index. The first sub-MAP message 404 may include information elements of the plurality of information elements including resource allocation information for a first set of subscriber stations as explained in conjunction with FIG. 1. The subsequent sub-MAP message 406 may be a compressed sub-MAP message such as the second sub-MAP message of FIG. 3 including at least one compressed information element common to the first sub-MAP message of FIG. 3. FIG. 4A illustrates the format of the index 402 such as index explained in conjunction with FIG. 2. The index 402 includes an index MAP header 402a; a plurality of entries such as CID Index1, CID Index2 (hereinafter collectively referred to as the plurality of entries 402b); and an error checking code 402c. The index MAP header 402a may be a 16 bit code.

The plurality of entries 402b may be constituted by one of the plurality of first parts, formed by splitting CIDs of subscriber stations that are allocated resources by the base station such as the base station 102. Each entry of the plurality of entries 402b may range from about 8 bits to 16 bits based on the predefined criteria. The error checking code 402c may be a 16 bit code for correct decoding and checking errors. Example of the error checking code 402c includes, but is not limited to a Cyclic Redundancy Code (CRC). The index 402 is transmitted to the plurality of subscriber stations by the base station. Each subscriber station of the plurality of subscriber stations compares each entry of the plurality of entries 402b in the index 402 with an equivalent part of a CID associated with the subscriber station for a match. As explained in conjunction with FIG. 1, the base station transmits the at least one sub-MAP message after transmitting the index 402.

FIG. 4B illustrates the format of the first sub-MAP message 404 transmitted by the base station. As explained above, the base station may transmit the first sub-MAP message 404 to the first set of subscriber stations such as the set of subscriber stations 106 from the plurality of subscriber stations. The first sub-MAP message 404 includes a sub-MAP header 404a, a plurality of DL information elements (hereinafter collectively referred to as DL IEs 404b) and a plurality of UL information elements (hereinafter collectively referred to as UL IEs 404c) and an error checking code 404d. A subscriber station of the first set of subscriber stations with an equivalent part of a CID matching with an entry of the plurality of entries in the index recombines the remaining part of the CID from the first sub-MAP message to generate a recombined CID. A match of the recombined CID and the CID associated with the subscriber station implies that the subscriber station has been allocated a resource by the base station. The subscriber station may then decode information elements pertaining to the DL and the UL using the DL IEs 404b and the UL IEs 404c respectively. The DL IEs 404b and the UL IEs 404c include the resource allocation information for subscriber stations with CID matching the recombined CID.

FIG. 4C illustrates the format of the subsequent sub-MAP message 406 transmitted by the base station to the second set of subscriber stations such as the set of subscriber stations 106. The subsequent sub-MAP message 406 includes components similar to the first sub-MAP message 404. The subsequent sub-MAP message 406 includes a sub-MAP header 406a, a plurality of DL information elements (hereinafter collectively referred to as DL IEs 406b), a plurality of UL information elements (hereinafter collectively referred to as UL IEs 406c) and an error checking code 406d. A subscriber station of the second set of subscriber stations follows a similar method as a subscriber station in the first set of subscriber stations explained above and decodes resource allocation information conveyed in the DL IEs 406b and UL IEs 406c. It will be evident to those skilled in the art that the plurality of subscriber stations in the wireless communication network may include a plurality of sets of subscriber stations and accordingly, the base station may transmit a plurality of sub-MAP messages.

Figure 5:
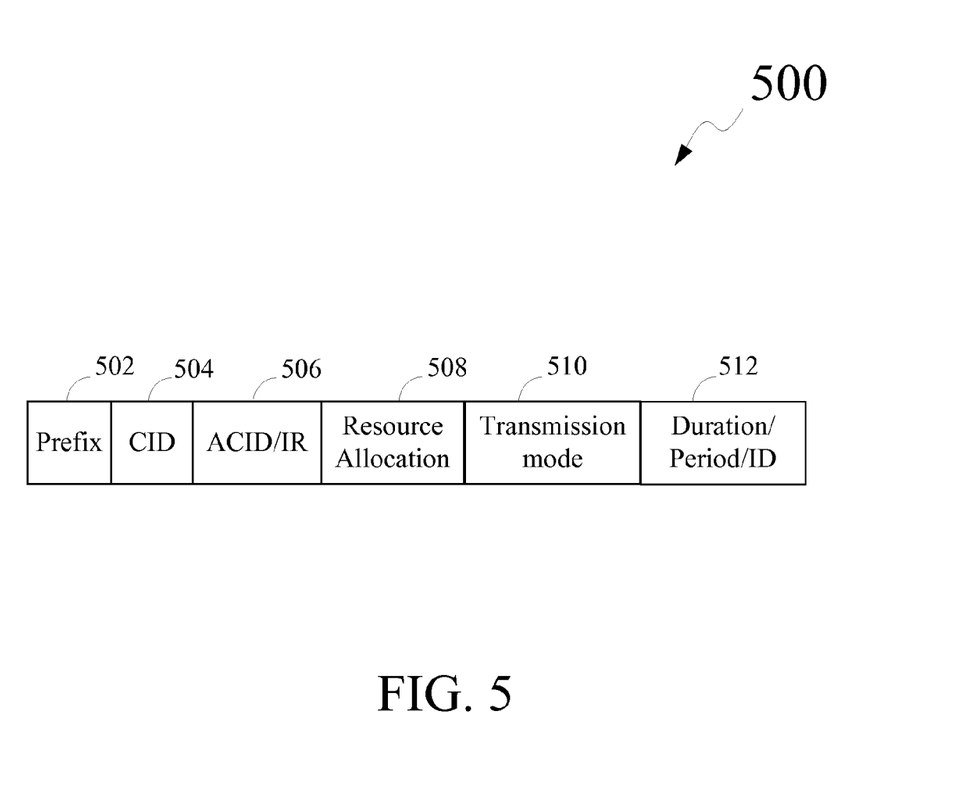
FIG. 5 illustrates a structure of an information element in a sub-MAP message, in accordance with an exemplary embodiment of the present disclosure.

FIG. 5 illustrates a structure of an information element 500 in a sub-MAP message, in accordance with an exemplary embodiment of the present disclosure. As explained in conjunction with FIG. 4, the sub-MAP message includes a plurality of DL information elements (such as DL IEs 404b) and a plurality of UL information elements (such as UL IEs 404c). FIG. 5 illustrates the structure of an information element which may be one of a DL information element of the plurality of DL information elements and a UL information element of the plurality of UL information elements. The information element 500 includes information bits for each of a prefix field 502, a CID field 504, an HARQ flow ID (ACID)/Incremental Redundancy version (IR) field 506, a resource allocation field 508, a transmission mode field 510, and a duration and ID field 512. The prefix field 502 identifies type of the information element 500 in terms of allocation of resources to a subscriber station of the plurality of subscriber stations. In one embodiment of the present disclosure, the prefix field 502 is allocated four bits.

Figure 6A:
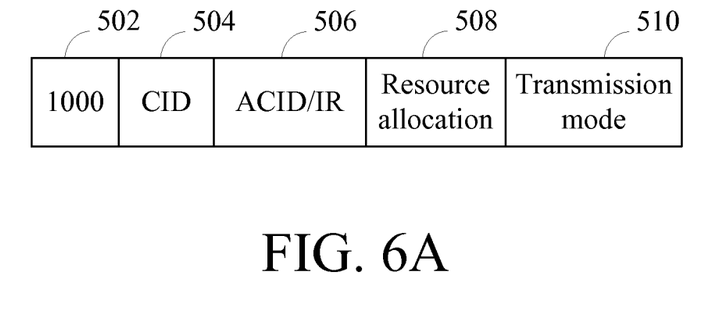
FIGS. 6A-6H illustrate different configurations of the structure of the information element of FIG. 5, in accordance with various embodiments of the present disclosure.

The CID field 504 includes a CID, such as the CID explained in conjunction with FIG. 2, for uniquely identifying a subscriber station of the plurality of subscriber stations. Number of bits in the CID field 504 may vary from 8 bits to 16 bits. The ACID/IR field 506 is assigned four to six bits in the information element 500. A value in the ACID/IR field 506 represents an HARQ flow ID and an HARQ redundancy version number. The resource allocation field 508 indicates a physical resource that has been allocated in the information element 500 to a subscriber station associated with a CID mentioned in the CID field 504. The transmission mode field 510 depicts a MCS level and a Multiple Input Multiple Output (MIMO) mode. The MIMO mode refers to utilization of multiple antennas both at a source and at a destination, i.e. at the base station and at a subscriber station of the plurality of subscriber stations. The duration and ID field 512 depicts duration and period of static allocation and an allocation ID associated with the static allocation. Different configurations of the structure of the information element 500 will be explained in conjunction with FIG. 6.

FIGS. 6A-6H illustrate different configurations of the structure of the information element 500 of FIG. 5, in accordance with various embodiments of the present disclosure. FIG. 6A illustrates a configuration of the information element 500 with a value of bits in the prefix field 502 equal to 1000. The value of bits in the prefix field 502 equaling 1000 denotes that the information element 500 represents a normal HARQ allocation. In the normal HARQ allocation, the information element 500 includes the CID field 504, the ACID/IR field 506, the resource allocation field 508 and the transmission mode field 510, as shown in the FIG. 6A. The duration and ID field 512 may be excluded from the information element 500, thereby compressing the information element 500. It will be obvious to a person skilled in the art that the duration and ID field 512 may be excluded, as there is no static allocation.

Figure 6B:
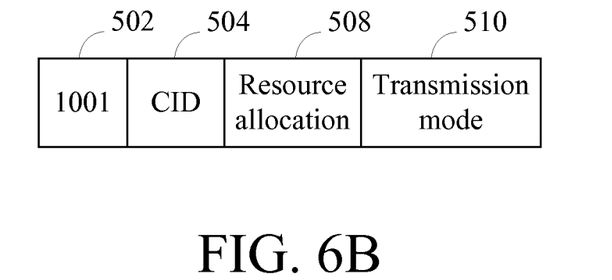

FIG. 6B illustrates a configuration of the information element 500 with a value of bits in the prefix field 502 equal to 1001. The value of bits in the prefix field 502 equaling 1001 denotes that the information element 500 represents a non-HARQ allocation. In the non-HARQ allocation, the information element 500 includes the CID field 504, the resource allocation field 508 and the transmission mode field 510, as shown in the FIG. 6B. The HARQ flow ID (ACID)/Incremental Redundancy version (IR) field 506 and the duration and ID field 512 may be excluded from the information element 500, thereby compressing the information element 500. It will be evident to a person skilled in the art that the ACID/IR may be excluded since the information element 500 is the non-HARQ allocation. Further, the duration and ID field 512 may be excluded as there is no static allocation.

Figure 6C:
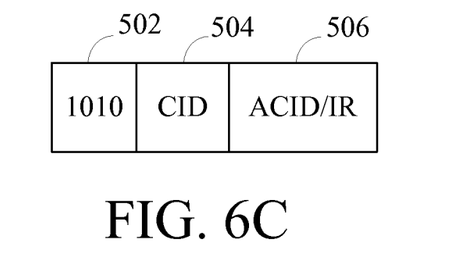

FIG. 6C illustrates a configuration of the information element 500 with a value of bits in the prefix field 502 equal to 1010. The value of bits in the prefix field 502 equaling 1010 denotes that the information element 500 represents a repeated normal HARQ allocation. In the repeated normal HARQ allocation, the information element 500 includes the CID field 504 and the ACID/IR field 506, as shown in the FIG. 6C. The resource allocation field 508, the transmission mode field 510 and the duration and ID field 512 may be excluded from the information element 500, thereby compressing the information element 500. The ACID/IR may be included in the information element as the information element is of repeated HARQ type. Moreover, the resource allocation field 508 and the transmission mode field 510 may be compressed as the information element is of repeated HARQ type. The resource allocation information and the transmission mode information may be repeated for consecutive transmissions and may be excluded from subsequent transmissions. Further, the duration and ID field 512 is compressed as there is no static allocation.

Figure 6D:
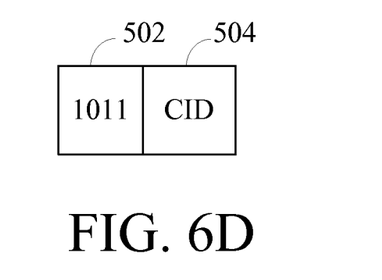

FIG. 6D illustrates a configuration of the information element 500 with a value of bits in the prefix field 502 equal to 1011. The value of bits in the prefix field 502 equaling 1011 denotes that the information element 500 represents a repeated non-HARQ allocation. In the repeated non-HARQ allocation, the information element 500 includes only the CID field 504, as shown in the FIG. 6D. The ACID/IR field 506, the resource allocation field 508, the transmission mode field 510 and the duration and ID field 512 may be excluded from the information element 500, thereby compressing the information element 500. The ACID/IR may be compressed in the information element 500 as the information element 500 is of repeated non-HARQ type. Moreover, the resource allocation information and the transmission mode information be repeated for consecutive transmissions and may be excluded from subsequent transmissions. Further, the duration and ID field 512 is compressed as there is no static allocation.

Figure 6E:
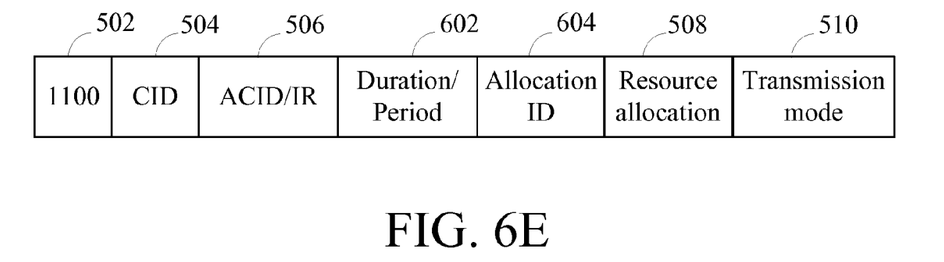

FIG. 6E illustrates a configuration of the information element 500 with a value of bits in the prefix field 502 equal to 1100. The value of bits in the prefix field 502 equaling 1100 denotes that the information element 500 represents a static allocation. In the static allocation, the information element 500 includes the CID field 504, the ACID/IR field 506, a duration field 602 and an allocation ID field 604, the resource allocation field 508 and the transmission mode field 510, as shown in FIG. 6E. Since the information element 500 represents a static allocation of resources, the allocation ID field 604 and the duration field 602 representing period of static allocation may be included. With static allocation of resources, an instance of allocation repeats with a pre-determined pattern, without need for additional signaling.

Figure 6F:
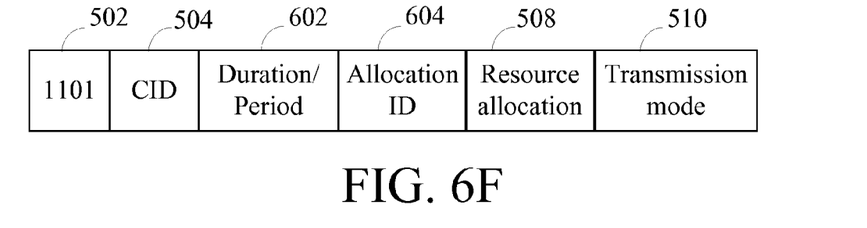

FIG. 6F illustrates a configuration of the information element 500 with a value of bits in the prefix field 502 equal to 1101. The value of bits of the prefix field 502 equaling 1101 denotes that the information element 500 represents a static non-HARQ allocation. In the static non-HARQ allocation, the information element 500 includes the CID field 504, the duration field 602 and the allocation ID field 604, the resource allocation field 508 and the transmission mode field 510, as shown in FIG. 6F. The ACID/IR field 506 may be excluded from the information element 500, thereby compressing the information element 500. The ACID/IR field 506 may be compressed in the information element 500 as the information element 500 is of static non-HARQ type. Since the information element 500 represents a static allocation of resources, the allocation ID field 604 and the duration field 602 representing period of static allocation may be included.

Figure 6G:
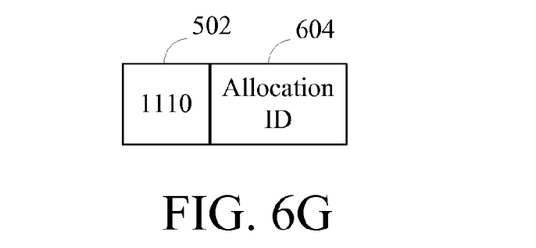

FIG. 6G illustrates a configuration of the information element 500 with a value of bits in the prefix field 502 equal to 1110. The value of bits of the prefix field 502 equaling 1110 denotes that the information element 500 represents a static allocation cancel information element. The static allocation cancel information element includes only the allocation ID field 604 to cancel allocation of a resource, as shown in FIG. 6G. The ACID/IR field 506, the CID field 504, the duration field 602, the resource allocation field 508 and the transmission mode field 510 may be excluded from the information element 500, thereby compressing the information element 500.

Figure 6H:
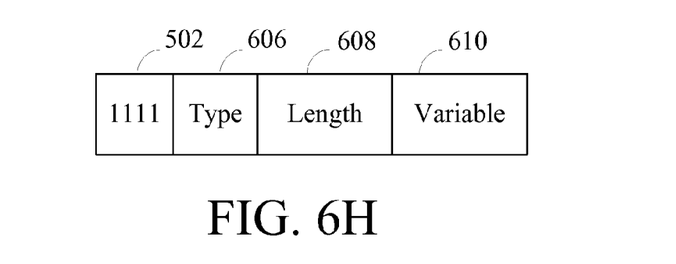

FIG. 6H illustrates a configuration of the information element 500 with a value of bits in the prefix field 502 equal to 1111. The value of bits of the prefix field 502 equaling 1111 denotes that the information element 500 represents an extended information element format. The extended information element format includes a type field 606, a length field 608 and a variable field 610. The type field 606 indicates type of the extended information element. The length field 608 represents length of the extended information element and the variable field 610 conveys information corresponding to the type of the extended information element.

As explained in the present disclosure, the sub-MAP message format provides improved spectral efficiency as compared to the jointly-coded MAP format. Further, the sub-MAP message format offers superior trunk efficiency and lower complexity as compared to the separately-coded MAP format. The index, as explained in conjunction with FIG. 2, allows a subscriber station from a plurality of subscriber stations to switch to a power-saving mode, thereby conserving power and improving power efficiency. Additionally, the present disclosure provides improved design of an information element that is contained in the sub-MAP message. The improved design of the information element takes advantage of correlation between consecutive allocations to reduce overhead for signaling resource allocation and transmission mode.

As described above, the embodiments of the present disclosure may be embodied in the form of computer-implemented processes and apparatuses for triggering a wireless device to perform sensing of wireless spectrum for detecting interference in a wireless medium. Embodiments of the present disclosure may also be embodied in the form of computer program code containing instructions embodied in tangible media, such as a computer program product, floppy diskettes, CD-ROMs, hard drives, or any other computer-readable storage medium, wherein, when the computer program code is loaded into and executed by a computer, the computer becomes an apparatus for practicing the present disclosure. The present disclosure may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A method for improving power efficiency of a plurality of subscriber stations in a wireless communication network, the method comprising:
   receiving, by at least one subscriber station, resource allocation information using at least one sub-Media Access Protocol (sub-MAP) message, each sub-MAP message comprising a plurality of information elements, each information element comprising a Connection Identifier (CID), the CID uniquely identifying at least one of the plurality of subscriber stations;
   receiving, by at least one subscriber station, a split CID that includes a first part and a second part based on pre-defined criteria;
   receiving, by at least one subscriber station, an index comprising a plurality of entries, wherein the plurality of entries in the index includes one of the first or second parts;
   switching, by at least one subscriber station, to a power-saving mode in the absence of a match between each entry of the plurality of entries in the index and an equivalent part of CIDs associated with one or more of the plurality of subscriber stations; and
   recombining, by at least one subscriber station, a split CID to determine the resource allocation information when the equivalent part of CID associated with the at least one subscriber station matches an entry of the plurality of entries in the index.

2. The method of claim 1, wherein the first part is several Least Significant Bits (LSBs) of the CID or several Most Significant Bits (MSBs) of the CID.

3. The method of claim 1, wherein the second part is remainder of the Most Significant Bits (MSBs) of the CID or the remainder of the Least Significant Bits (LSBs) of the CID.

4. The method of claim 1, wherein the pre-defined criteria comprises at least one of maximum number of the information elements supported by the sub-MAP message and a probability of multiple subscribers having the same index.

5. The method of claim 1, wherein the plurality of information elements in a sub-MAP message of the at least one sub-MAP message is compressed.

6. The method of claim 1, further comprising:
   receiving, by at least one subscriber station, a first sub-MAP message comprising resource allocation information for one or more of the plurality of subscriber stations;

receiving, by at least one subscriber station, a second sub-MAP message comprising at least one compressed information element of the plurality of information elements, wherein a value of the at least one compressed information element is constant for the consecutive allocations.

7. The method of claim 6, wherein the value of the at least one information element is at least one of a channel information and a scheduling information.

8. A computer program product embodied on a non-transitory computer readable medium, the computer program product comprising a program module having instructions which cause a computer to perform the following operations, comprising:

receive resource allocation information using at least one sub-Media Access Protocol (sub-MAP) message, each sub-MAP message comprising a plurality of information elements, each information element comprising a Connection Identifier (CID), the CID uniquely identifying at least one of a plurality of subscriber stations in a wireless communications network;

receive a split CID that includes a first part and a second part based on pre-defined criteria;

receive an index comprising a plurality of entries, wherein the plurality of entries in the index includes one of the first or second parts;

switch to a power-saving mode in the absence of a match between each entry of the plurality of entries in the index and an equivalent part of CIDs associated with one or more of the plurality of subscriber stations; and recombine a split CID to determine the resource allocation information when the equivalent part of CID associated with a subscriber station matches an entry of the plurality of entries in the index.

9. The computer program product of claim 8, wherein the first part is several Least Significant Bits (LSBs) of the CID or several Most Significant Bits (MSBs) of the CID.

10. The computer program product of claim 8, wherein the second part is remainder of the Most Significant Bits (MSBs) of the CID or the remainder of the Least Significant Bits (LSBs) of the CID.

11. The computer program product of claim 8, wherein the pre-defined criteria comprises at least one of maximum number of the information elements supported by the sub-MAP message and a probability of multiple subscribers having the same index.

12. The computer program product of claim 8, wherein the plurality of information elements in a sub-MAP message of the at least one sub-MAP message is compressed.

13. The computer program product of claim 8, wherein the instructions which cause a computer to perform the following additional operations, comprising:

receive a first sub-MAP message comprising resource allocation information for one or more of the plurality of subscriber stations;

receive a second sub-MAP message comprising at least one compressed information element of the plurality of information elements, wherein a value of the at least one compressed information element is constant for the consecutive allocations.

14. The computer program product of claim 13, wherein the value of the at least one information element is at least one of a channel information and a scheduling information.

15. A base station for improving power efficiency of a plurality of subscriber stations in a wireless communication network, the base station comprising at least one processor configured to:

group a set of subscriber stations based on a common characteristic;

allocate resources to the set of subscriber stations using at least one block-coded Media Access Protocol (MAP) message (sub-MAP message); each sub-MAP message comprising a plurality of information elements, each information element comprising a Connection Identifier (CID), the CID uniquely identifying at least one of the plurality of subscriber stations;

split each CID into a first part and a second part based on pre-defined criteria;

generate an index comprising a plurality of entries, wherein the plurality of entries in the index includes one of the first or second parts;

transmit the index to the plurality of subscriber stations;

transmit the at least one sub-MAP message comprising resource allocation information for one or more of the plurality of subscriber stations;

compress at least one information element of the plurality of information elements, wherein a value of the at least one information element is constant for consecutive allocations; and transmit a second sub-MAP message comprising the at least one compressed information element to the plurality of subscriber stations.

16. The base station of claim 15, wherein the first part is several Least Significant Bits (LSBs) of the CID or several Most Significant Bits (MSBs) of the CID.

17. The base station of claim 15, wherein the second part is remainder of the Most Significant Bits (MSBs) of the CID or the remainder of the Least Significant Bits (LSBs) of the CID.

18. The base station of claim 15, wherein the pre-defined criteria comprises at least one of maximum number of the information elements supported by the sub-MAP message and a probability of multiple subscribers having the same index.

19. The base station of claim 15, wherein the plurality of information elements in a sub-MAP message of the at least one sub-MAP message is compressed.

20. The base station of claim 15, wherein the value of the at least one information element is at least one of a channel information and a scheduling information.

* * * * *